(12) United States Patent
He et al.

(10) Patent No.: US 8,670,306 B2
(45) Date of Patent: Mar. 11, 2014

(54) METHOD AND SYSTEM FOR SERVICE PROTECTION

(75) Inventors: Jia He, Shenzhen (CN); Yang Yang, Shenzhen (CN); Haiyan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 353 days.

(21) Appl. No.: 12/910,480

(22) Filed: Oct. 22, 2010

(65) Prior Publication Data

US 2011/0038258 A1    Feb. 17, 2011

Related U.S. Application Data

(63) Continuation of application No. PCT/CN2009/071158, filed on Apr. 3, 2009.

(30) Foreign Application Priority Data

Apr. 22, 2008    (CN) .......................... 2008 1 0066838

(51) Int. Cl.
*H04L 1/00*    (2006.01)

(52) U.S. Cl.
USPC .......................................... 370/228; 370/360

(58) Field of Classification Search
USPC .......................................................... 370/228
See application file for complete search history.

(56) References Cited

U.S. PATENT DOCUMENTS 5,757,769 A * 5/1998 Ikawa ............................ 370/228

FOREIGN PATENT DOCUMENTS

| CN | 1710869 A | 12/2005 | |
|---|---|---|---|
| CN | 1805399 A | 7/2006 | |
| CN | 1874201 A | 12/2006 | |
| CN | 1929341 A | 3/2007 | |
| EP | 1083711 A2 * | 3/2001 | .............. H04L 12/56 |
| KR | 10-2006-0071086 | 6/2006 | |
| WO | WO 00/76147 A1 | 12/2000 | |

OTHER PUBLICATIONS

Office Action issued in corresponding Chinese Patent Application No. 200810066838.5, mailed Sep. 21, 2008.
Office Action issued in corresponding European Patent Application No. 09735052.4, mailed Feb. 27, 2012.
Written Opinion of the International Searching Authority issued in corresponding PCT Patent Application No. PCT/CN2009/071158, mailed Jul. 16, 2009.

(Continued)

*Primary Examiner* — Wanda Z Russell
(74) *Attorney, Agent, or Firm* — Brinks Gilson & Lione

(57) ABSTRACT

A method for service protection is disclosed, which is applied to a 1:n switching technique. The method includes the following steps. A source end sends a service to a work transmission entity, the work transmission entity performs performance monitoring through the transmitted service, a sink end receives the service from the work transmission entity; when a Signal Degrade (SD) fault occurs at the work transmission entity, the source end sends the service to the work transmission entity and a protection transmission entity simultaneously, and the sink end selects to receive the service from the protection transmission entity; the protection transmission entity performs the performance monitoring through the transmitted service; when the SD fault occurs at both the work transmission entity and the protection transmission entity, the sink end still receives the service from the protection transmission entity. A system for service protection is also disclosed. Technical solutions enable the service to get valid protection during the transmission process, and avoid frequent switching of the service, thereby improving the service quality.

12 Claims, 13 Drawing Sheets

(56) References Cited

OTHER PUBLICATIONS

Extended European Search Report issued in corresponding European Patent Application No. 09735052.4, mailed Jul. 12, 2011.
Telecommunication Standardization Sector, "Draft New Recommendation G.808.1, version 0.6 (for consent)", Editorial Recommendation—International Telecommunication Union. Oct. 21-31, 2003.
Telecommunication Standardization Sector, "ATM Protection Switch" Series I: Integrated Services Digital Network—Maintenance Principles. Feb. 1999.
Zhang et al., "SD-Triggered Protection Switching in MPLS-TP", WPLS Working Group. IETF Trust. Oct. 19, 2009.
International Search Report issued in corresponding PCT Application No. PCT/CN2009/071158; Jul. 16, 2009.

* cited by examiner

METHOD AND SYSTEM FOR SERVICE PROTECTION

CROSS-REFERENCE TO RELATED APPLICATIONS

This application is a continuation of International Application No. PCT/CN2009/071158, filed on Apr. 3, 2009, which claims priority to Chinese Patent Application No. 200810066838.5, filed on Apr. 22, 2008, both of which are hereby incorporated by reference in their entireties.

FIELD OF THE INVENTION

The present invention relates to the field of communications service protection technique, and in particular, to a method for service protection and a system for service protection.

BACKGROUND OF THE INVENTION

In a communications system, when faults occur at transport network nodes or links, protection switching needs to be performed, that is, a service on the path with the fault is handed over to a pre-assigned standby path for transportation, thereby not affecting transmission of the service.

The protection switching has different protection types, which mainly include 1+1 protection, 1:n protection, and m:n protection. In the protection switching of the 1:n protection type, n work transmission entities share one protection transmission entity, that is, at the same moment, only one normal service can be protected, in which n≥1. Under a normal situation, the normal service is transmitted on the work transmission entity, and an extra service or no service is transmitted on the protection transmission entity. When the fault is detected on one work transmission entity, the normal service originally transmitted on the work transmission entity is switched to the protection transmission entity on an ingress node and an egress node of a protection domain. Here, if an extra service is originally transmitted on the protection transmission entity, the extra service is cut off.

The service switching is implemented through cooperation work of the work transmission entity, the protection transmission entity, a bridge on the ingress node, and a selector on the egress node. Two types of bridges, namely, a selective bridge and a broadcasting bridge, may be adopted on the ingress node.

Referring to FIG. 1, a schematic view of a 1:n protection switching system using a broadcasting bridge on an ingress node is shown.

When a work transmission entity normally works, the ingress node only sends a normal service on the work transmission entity through the bridge, and an egress node receives the normal service from the work transmission entity through a selector. Here, a protection transmission entity may or may not transmit an extra service. When the extra service is transmitted, the ingress node transmits the extra service on the protection transmission entity through the bridge, and the egress node receives the extra service on the protection transmission entity through the selector.

When a fault occurs at the work transmission entity, the egress node determines that a Signal Fail (SF) or Signal Degrade (SD) fault occurs at the work transmission entity through fault detection or performance monitoring on the work transmission entity. If the fault does not occur at the protection transmission entity at this time, the ingress node transmits the normal service on the work transmission entity and the protection transmission entity simultaneously through the bridge. If the extra service is originally transmitted on the protection transmission entity, the ingress node further needs to cut off the transmission of the extra service. The egress node receives the normal service on the protection transmission entity through the selector, thereby completing protection switching.

Referring to FIG. 2, a schematic view of a 1:n protection switching system using a selective bridge on an ingress node is shown.

When a work transmission entity normally works, the ingress node only sends a normal service on the work transmission entity through the bridge, and an egress node receives the normal service on the work transmission entity through a selector. Here, the protection transmission entity may or may not transmit the extra service. When the extra service is transmitted, the ingress node transmits the extra service on the protection transmission entity through the bridge, and the egress node receives the extra services on the protection transmission entity through the selector.

When an SF or SD fault occurs at the work transmission entity, if the fault does not occur at the protection transmission entity at this time, the ingress node switches the normal service originally transmitted on the work transmission entity at which the fault occurs to the protection transmission entity through the bridge for being transmitted. If the extra service is originally transmitted on the protection transmission entity, the ingress node further needs to cut off the transmission of the extra service. The egress node receives the normal service on the protection transmission entity, thereby completing protection switching.

For the SD fault, the prior art may have the following disadvantages.

In a packet-based network, fault detection of a transmission entity is performed according to whether an egress node receives a connectivity detection packet in a preset time, so as to determine whether an SF fault occurs at the transmission entity; and performance monitoring, for example, monitoring on a packet loss ratio, of the transmission entity is performed according to a service packet, so as to determine whether an SD fault occurs at the transmission entity. The transmission entity always sends the connectivity detection packet for performing the fault detection. When an ingress node uses a broadcasting bridge and a protection transmission entity does not transmit any extra service, under a normal situation, if performance degrade occurs at both a work transmission entity and the protection transmission entity, the work transmission entity is in the state of SD fault. Because the extra service is not transmitted on the protection transmission entity, the performance monitoring cannot be performed on the protection transmission entity, even if the performance degrade occurs at the protection transmission entity, the state of the protection transmission entity is still normal instead of showing the SD fault. If the protection switching is triggered when the SF fault is not shown at both the protection transmission entity and work transmission entity, it is possible that the normal service protection is switched to the protection transmission entity with the poorer performance when the performance degrade occurring at the protection transmission entity is more serious than the performance degrade occurring at the work transmission entity, as shown in FIG. 3, that is, an invalid service switch is performed, thereby further lowering the service quality.

When the ingress node uses a selective bridge, in addition to the disadvantages of the broadcasting bridge, if the SF or SD fault occurs at the work transmission entity, and the protection switching is performed, the ingress node only transmits the normal service on the protection transmission entity through the bridge. Because the service is not transmitted on the work transmission entity, the performance monitoring cannot be performed. Even if the performance degrade exists on the work transmission entity, the state of the work transmission entity is normal instead of showing the SD fault. Therefore, for a recoverable protection switching, the normal service may be switched back to the work transmission entity from the protection transmission entity. After the normal service is switched back to the work transmission entity, the performance degrade may be monitored on the work transmission entity, the state of the work transmission entity is the SD fault, the protection switching is performed again to switch the normal service to the protection transmission entity, as shown in FIG. 4. Thus, frequent switching of the normal service between the work transmission entity and the protection transmission entity is resulted, thereby seriously lowering the service quality and increasing system burdens.

SUMMARY OF THE INVENTION

The present invention is directed to a method for service protection and a system for service protection, which are capable of enabling a service to get valid protection during a transmission process.

An aspect of an embodiment of the present invention provides a method for service protection, applied to a 1:n switching technique, where the method includes:

sending, by a source end, a service to a work transmission entity, performing, by the work transmission entity, performance monitoring through the transmitted service, and receiving, by a sink end, the service from the work transmission entity;

sending, by the source end, the service to the work transmission entity and a protection transmission entity simultaneously, when an SD fault occurs at the work transmission entity, and selecting, by the sink end, to receive the service from the protection transmission entity;

performing, by the protection transmission entity, the performance monitoring through the transmitted service; and receiving, by the sink end, the service still from the protection transmission entity, when the SD faults occur at both the work transmission entity and the protection transmission entity.

Another aspect of an embodiment of the present invention provides a method for service protection, applied to a 1:n switching technique, where the method includes:

sending, by a source end, a service to a work transmission entity, performing, by the work transmission entity, performance monitoring through the transmitted service, and receiving, by a sink end, the service from the work transmission entity;

sending, by the source end, the service to the work transmission entity and a protection transmission entity simultaneously, when an SD fault occurs at the work transmission entity, and receiving, by the sink end, the service still from the work transmission entity;

performing, by the protection transmission entity, the performance monitoring through the transmitted service; and performing, by the sink end, comparison and judgment on the SD faults occurring at the work transmission entity and the protection transmission entity, when the SD faults occur at both the work transmission entity and the protection transmission entity, and selecting to receive the service from the work transmission entity or the protection transmission entity according to a judgment result.

An aspect of an embodiment of the present invention provides a system for service protection, applied to a 1:n switching technique, and including a work transmission entity, a protection transmission entity, a source end, and a sink end, where the work transmission entity is configured to transmit a service, and perform performance monitoring through the transmitted service;

the source end is configured to send the service to the work transmission entity; and send the service to the work transmission entity and the protection transmission entity simultaneously, when an SD fault occurs at the work transmission entity;

the protection transmission entity is configured to transmit the service, and perform the performance monitoring through the transmitted service; and the sink end is configured to receive the service from the work transmission entity; select to receive the service from the protection transmission entity, when the SD fault occurs at the work transmission entity; and still receive the service from the protection transmission entity, when the SD faults occur at the work transmission entity and the protection transmission entity.

Another aspect of an embodiment of the present invention provides a system for service protection, applied to a 1:n switching technique, and including a work transmission entity, a protection transmission entity, a source end, and a sink end, where the work transmission entity is configured to transmit a service, and perform performance monitoring through the transmitted service;

the source end is configured to send the service to the work transmission entity; and send the service to the work transmission entity and the protection transmission entity simultaneously, when an SD fault occurs at the work transmission entity;

the protection transmission entity is configured to transmit the service, and perform the performance monitoring through the transmitted service; and the sink end is configured to receive the service from the work transmission entity; still receive the service from the work transmission entity, when the SD fault occurs at the work transmission entity; perform comparison and judgment on the SD faults occurring at the work transmission entity and the protection transmission entity, when the SD faults occur at both the work transmission entity and the protection transmission entity, and select to receive the service from the work transmission entity or the protection transmission entity according to a judgment result.

As compared with the prior art, the present invention at least has the following advantages.

No matter the SD fault occurs at the work transmission entity, or the SD faults occur at both the work transmission entity and the protection transmission entity, the service may get valid protection during the transmission process; further, through the comparison and judgment on the SD faults occurring at the work transmission entity and the protection transmission entity, the sink end selects to receive the service from the work transmission entity or the protection transmission entity, so as to avoid frequent switching of the service between the work transmission entity and the protection transmission entity, thereby improving the service quality.

DETAILED DESCRIPTION OF THE EMBODIMENTS

Figure 1:
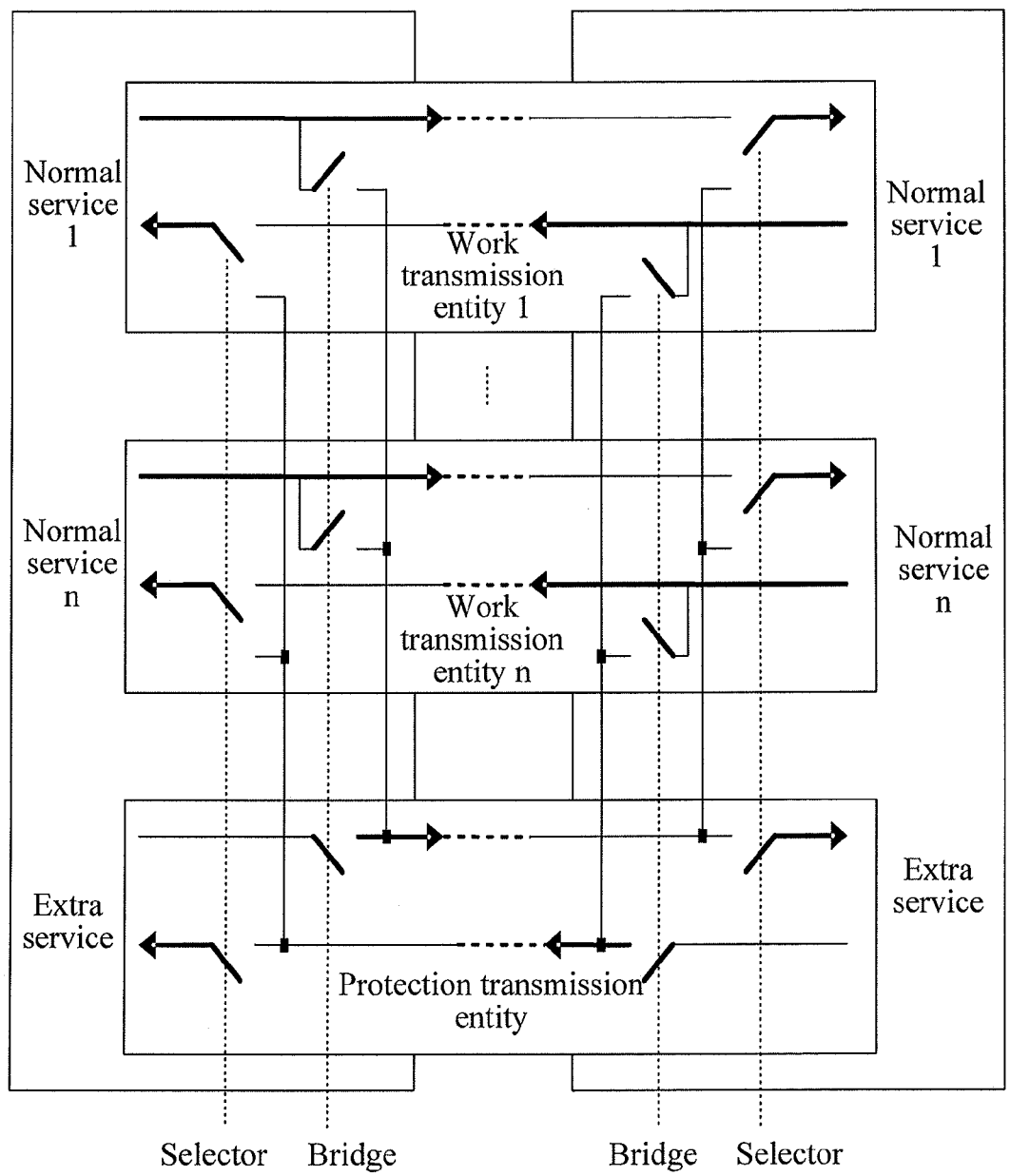
FIG. 1 is a schematic view of a 1:n protection switching system using a broadcasting bridge.
Figure 2:
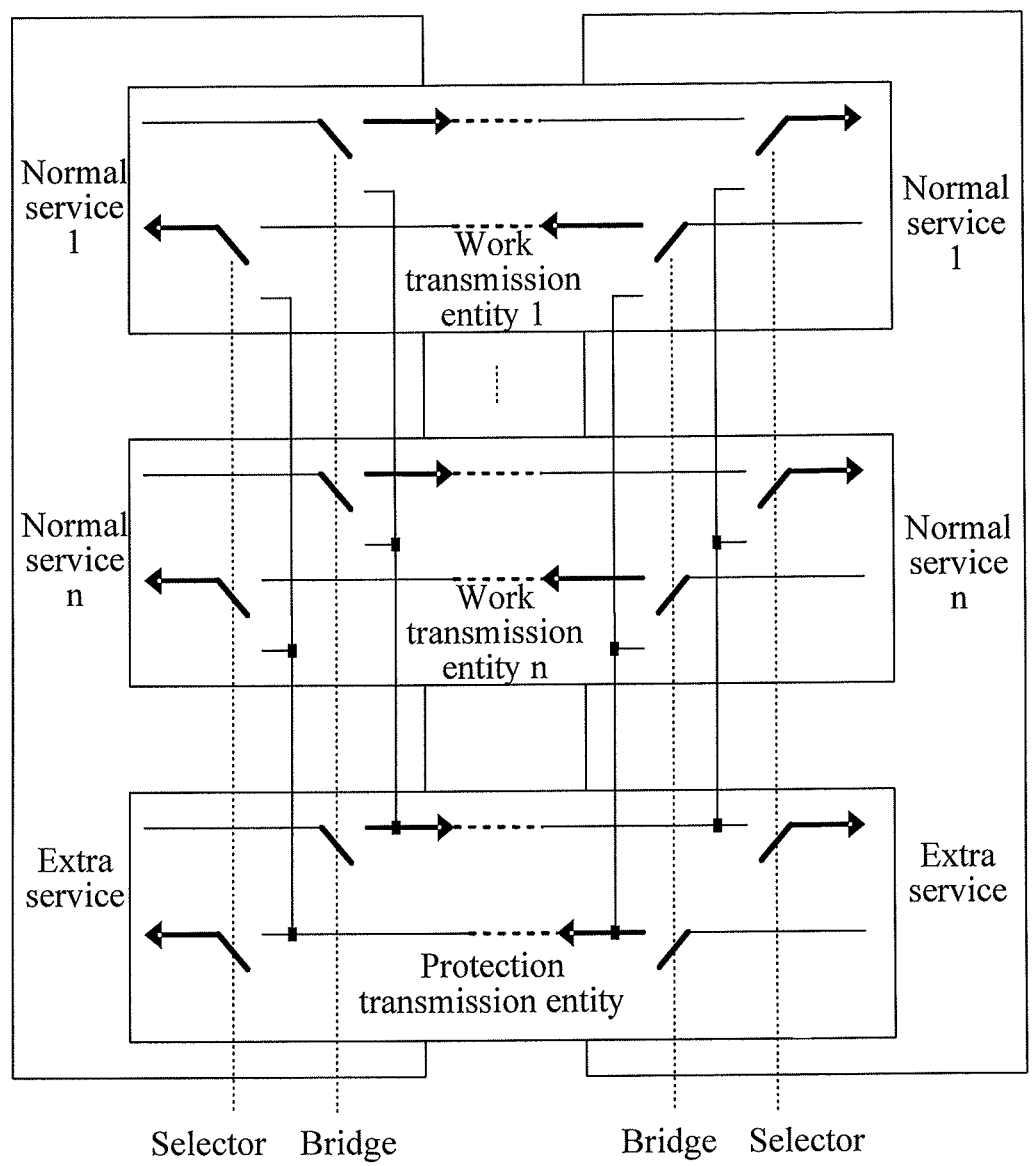
FIG. 2 is a schematic view of a 1:n protection switching system using a selective bridge.
Figure 3:
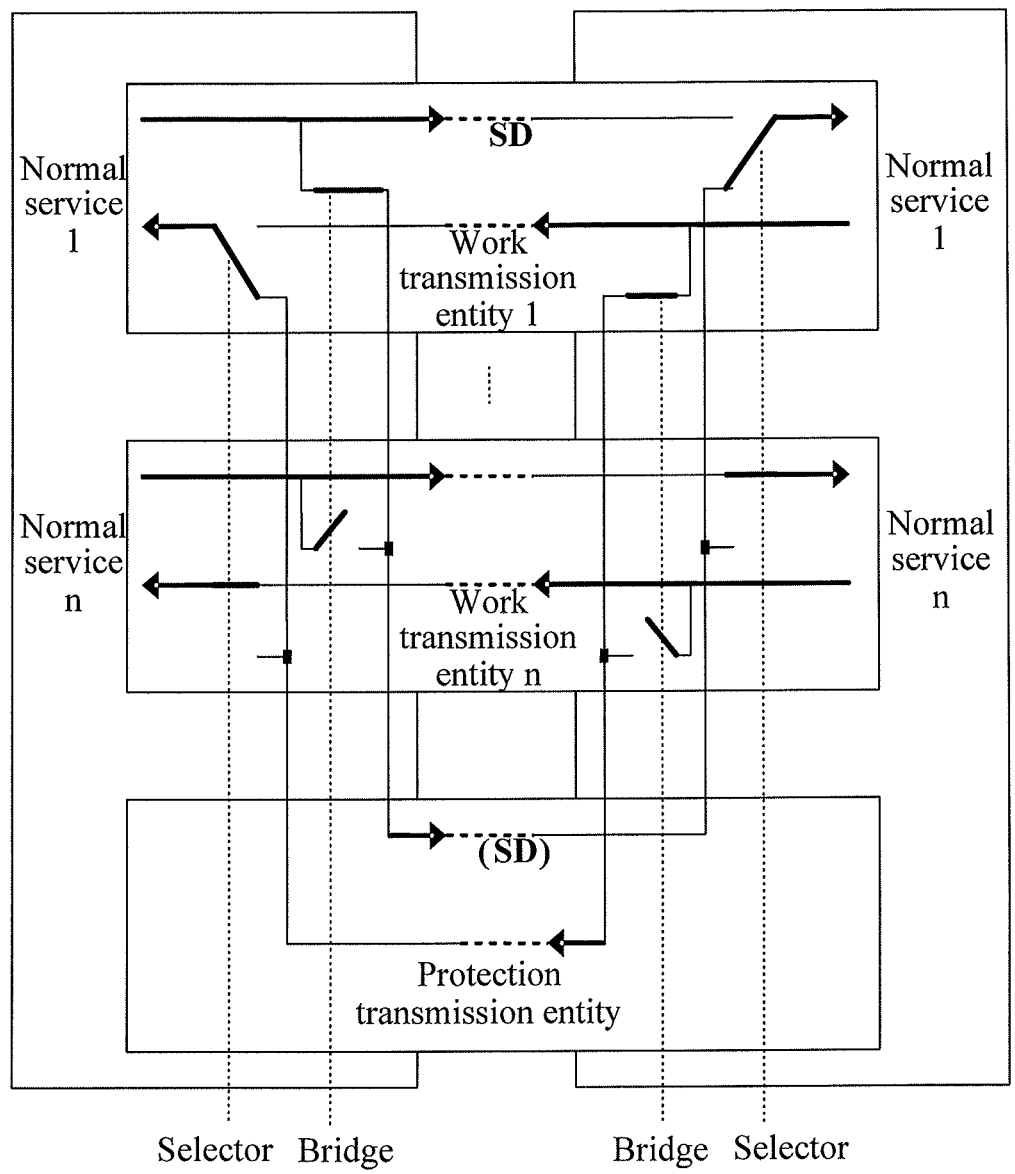
FIG. 3 is a schematic view of service transmission when a broadcasting bridge is used and an SD fault occurs both at a work transmission entity and a protection transmission entity.
Figure 4:
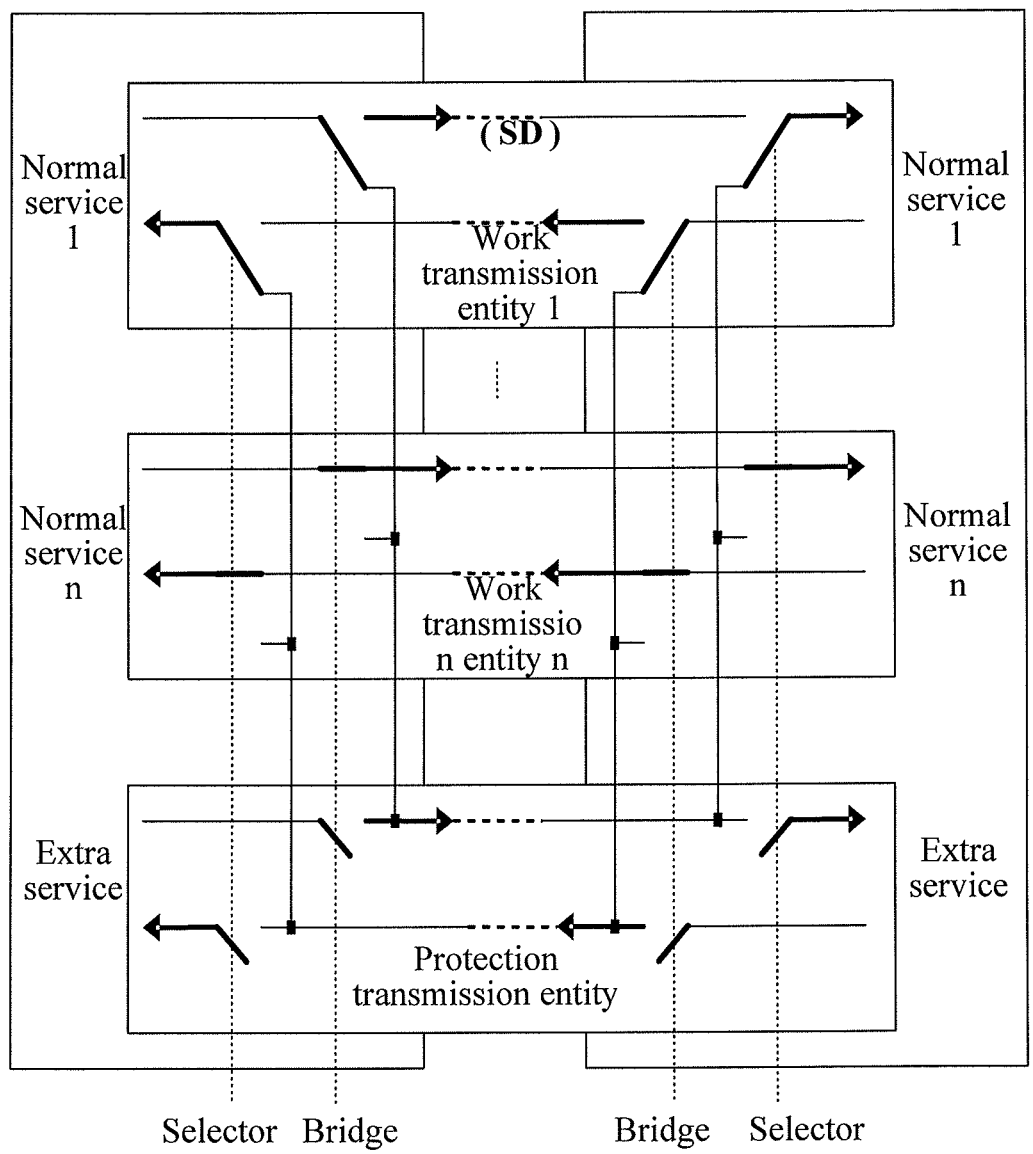
FIG. 4 is a schematic view of service transmission after protection switching when a selective bridge is used.

In the present invention, in a 1:n switching technique, performance monitoring is performed on a transmission entity without transmitting a service by transmitting a test packet, or the performance monitoring is performed on the transmission entity by using a connectivity detection packet, or the performance monitoring is performed on the transmission entity by obtaining a performance monitoring result of a transmission entity having the same path as the transmission entity without transmitting a service, thereby avoiding an invalid service switch, and improving the service quality.

A method for protection switching decision and a system for protection switching decision are described in detail through embodiments.

The method for protection switching decision according to the present invention is applied to a 1:n switching technique, and includes the following steps. Under a normal state, fault detection is performed on a work transmission entity and a protection transmission entity. A normal service is transmitted on the work transmission entity, and performance monitoring is performed on the work transmission entity through the transmitted normal service. When no extra service is transmitted on the protection transmission entity, the performance monitoring is performed on the protection transmission entity by transmitting a test packet on the protection transmission entity, or the performance monitoring is performed on the protection transmission entity by using a connectivity detection packet, or the performance monitoring is performed on the protection transmission entity by obtaining a performance monitoring result of a transmission entity having the same path as the protection transmission entity. When an extra service is transmitted on the protection transmission entity, being the same as that of the prior art, the performance monitoring is performed on the transmission entity through the transmitted extra service.

The performance monitoring performed under the normal state is used as a part of references for determining to perform protection switching.

It may be determined whether performance degrade occurs at the transmission entity through the performed performance monitoring. In addition, in this embodiment, the fault detection is performed on the work transmission entity and the protection transmission entity through the connectivity detection packet, so as to determine whether an SF fault occurs. Therefore, it is determined to perform the protection switching according to the performed performance monitoring and the performed fault detection. That is to say, when it is determined that an SF or SD fault occurs at the work transmission entity and the fault does not occur at the protection transmission entity according to the performed fault detection and the performed performance monitoring, it is determined to perform the protection switching. Alternatively, when it is further determined that the SF fault occurs at the work transmission entity, and the SF fault does not occur at the protection transmission entity but the SD fault occurs at the protection transmission entity, it is determined to perform the protection switching. Alternatively, when it is further determined that the SF fault does not occur at the work transmission entity and the protection transmission entity, but the SD faults occur at both the work transmission entity and the protection transmission entity, and the performance degrade occurring at the work transmission entity is more serious than the performance degrade occurring at the protection transmission entity, it is determined to perform the protection switching. For example, if the performance degrade occurs at the work transmission entity and the protection transmission entity due to packet loss, packet loss ratios of the two may be compared, in which if the packet loss ratio on the work transmission entity is greater than the packet loss ratio on the protection transmission entity, it is determined to perform the protection switching.

Except for the above situations of determining to perform the protection switching, the protection switching is not performed.

In this embodiment, when a broadcasting bridge is adopted on an ingress node, and after it is determined to perform the protection switching, the normal service is transmitted on both the work transmission entity and the protection transmission entity, and the performance monitoring is performed on the work transmission entity and the protection transmission entity through the transmitted normal service. When a selective bridge is adopted on the ingress node, and after it is determined to perform the protection switching, the normal service is switched from the work transmission entity to the protection transmission entity, and the performance monitoring is performed on the protection transmission entity through the transmitted normal service; the performance monitoring is performed on the work transmission entity by transmitting the extra service on the work transmission entity, or by transmitting the test packet, or by using the connectivity detection packet, or the performance monitoring is performed on the work transmission entity by obtaining the performance monitoring result of the transmission entity having the same path as the work transmission entity.

In this embodiment, under the normal state before the protection switching, when the extra service is transmitted on the protection transmission entity, the performance monitoring may be performed on the protection transmission entity through the transmitted extra service. If the extra service is also transmitted on the work transmission entity after the switching, the transmitted extra service before the switching is the same as or different from the transmitted extra service after the switching.

In this embodiment, the method further includes that after it is determined to perform switching recovery according to the performance monitoring performed after the switching and the fault detection performed all the time, the normal state is recovered.

In this embodiment, the specific manner of performing the performance monitoring on the transmission entity through the test packet and the connectivity detection packet is the same as the manner of performing the performance monitoring on the transmission entity through the normal service, that is, the performance monitoring is performed through a performance monitoring packet, which is not described here. For example, when the performance monitoring is performed through the connectivity detection packet, taking packet loss as an example, the packet loss ratio of the transmission entity is calculated according to the number of connectivity detection packets sent on the ingress node and the number of connectivity detection packets received on the egress node through the performance monitoring packet monitoring the packet loss.

In the manner of performing the performance monitoring through the test packet, a test pattern may be generated according to a situation of the practical service to be transmitted on the transmission entity, for example, the packet is sent by adopting the packet being the same as the practical service, thereby improving accuracy of the performance monitoring.

In the following, this embodiment is further described through applications under two different scenes of adopting the broadcasting bridge and the selective bridge on the ingress node.

Figure 5:
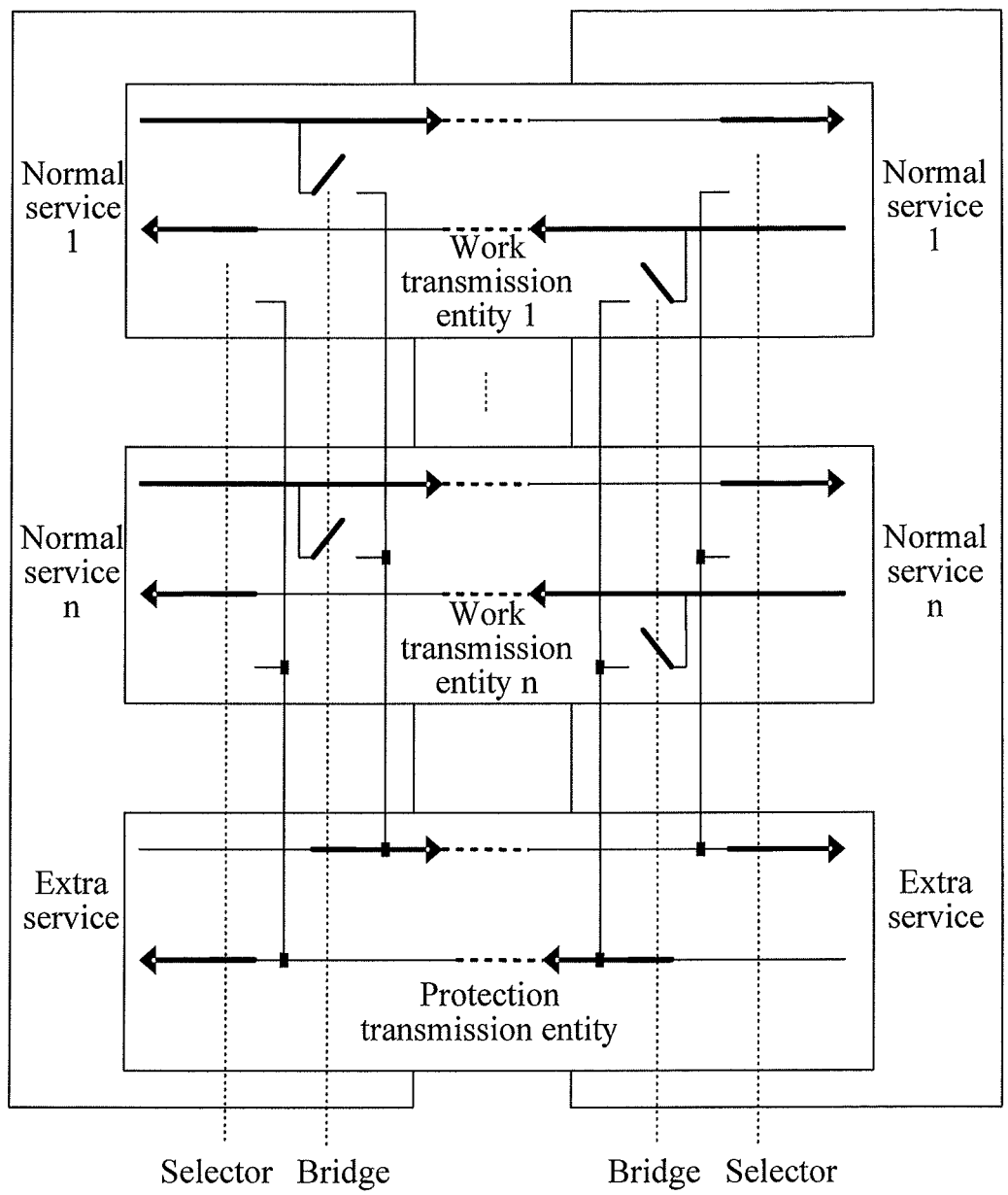
FIG. 5 is a schematic view of service transmission before protection switching under a scene of adopting a broadcasting bridge according to an embodiment of a method for protection switching decision.
Figure 6:
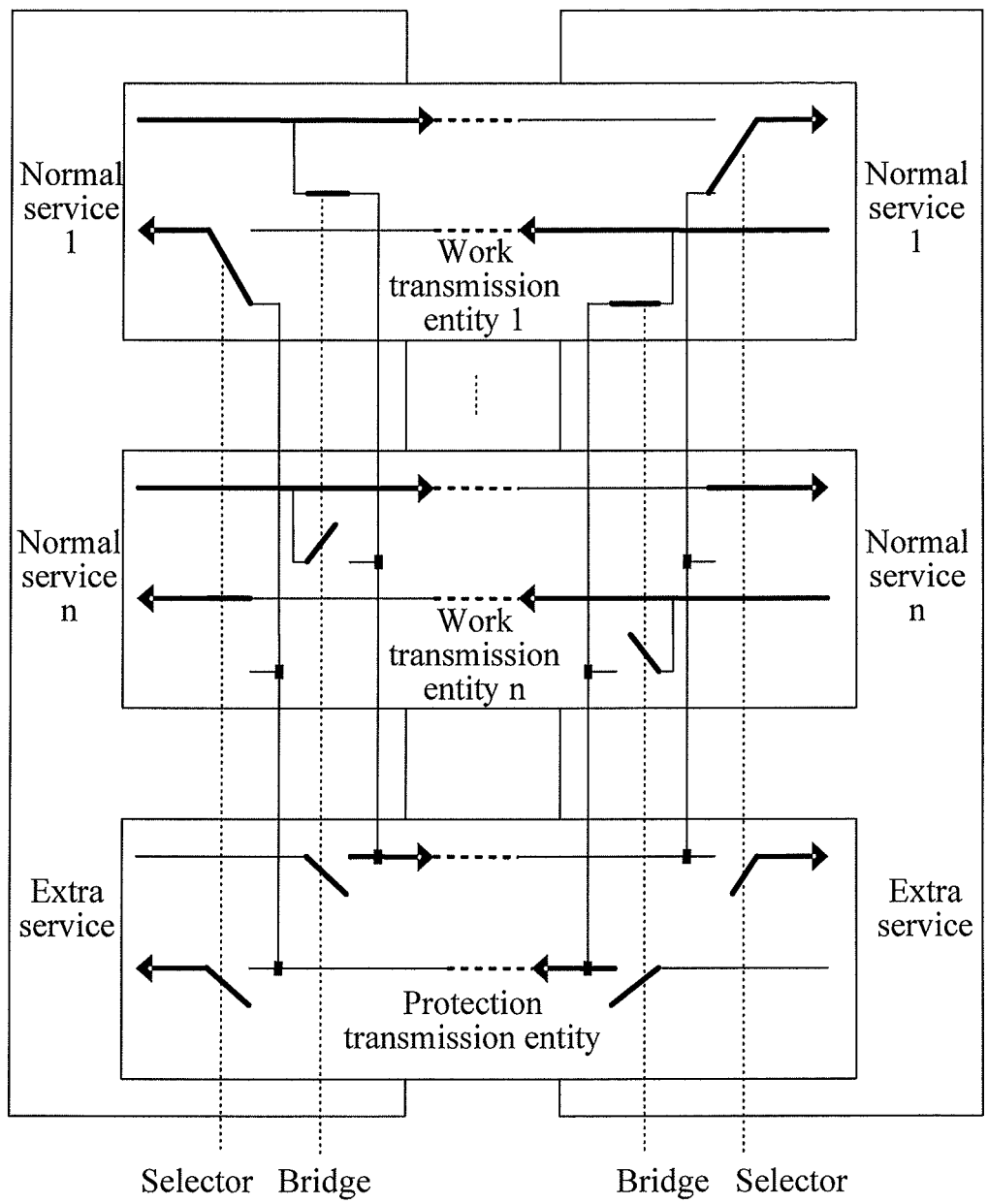
FIG. 6 is a schematic view of service transmission after protection switching under a scene of adopting a broadcasting bridge according to an embodiment of a method for protection switching decision.

The scene in which this embodiment is applied to a packet-based network, and 1:n protection is implemented when the broadcasting bridge is adopted on the ingress node is shown in FIGS. 5 and 6.

The scene as shown in FIG. 5 is the normal state before the protection switching. Under the state, each work transmission entity transmits the respective normal service, the fault detection is performed on the work transmission entity through the connectivity detection packet, and it is determined whether the SF fault occurs; and the performance monitoring is performed on the work transmission entity through the normal service transmitted on the work transmission entity, and it is determined whether the SD fault occurs.

The fault detection is performed on the protection transmission entity through the connectivity detection packet, and when the extra service is transmitted on the protection transmission entity, the performance monitoring is performed on the protection transmission entity through the transmitted extra service.

When no extra service is transmitted on the protection transmission entity, in addition to performing the fault detection through the connectivity detection packet, the performance monitoring may be performed by adopting the following three manners. In a first manner, the performance monitoring is performed by transmitting the test packet on the protection transmission entity through an OAM mechanism. In a second manner, the performance monitoring is performed through the always transmitted connectivity detection packet. In a third manner, the performance monitoring is performed on the transmission entity having the same path as the protection transmission entity, and performance parameters of the protection transmission entity are obtained. The same path here refers to that as the protection transmission entity, the additional transmission entity passes through the same nodes and the same links of the protection transmission entity between the ingress node and the egress node.

The mentioned shows the manner of the service transmission on the transmission entity and the manner of performing the fault detection and the performance monitoring on the transmission entity under the situation that no fault occurs on the work transmission entity. According to the fault detection and the performance monitoring performed on the transmission entity, it is determined whether to perform the protection switching.

Here, three situations of determining to perform the protection switching exist.

In a first situation of determining to perform the protection switching, if the fault occurs at a certain work transmission entity, including that it is determined that the SF fault occurs according to the performed fault detection and/or it is determined that the SD fault occurs according to the performed performance monitoring, and the SF fault and the SD fault do not occur at the protection transmission entity, it is determined to perform the protection switching.

In a second situation of determining to perform the protection switching, if the SF fault occurs at a certain work transmission entity, and the SD fault occurs at the protection transmission entity but the SF fault does not occur at the protection transmission entity, it is determined to perform the protection switching.

In a third situation of determining to perform the protection switching, the SD fault occurs at a certain work transmission entity but the SF fault does not occur at the work transmission entity, the SD fault occurs at the protection transmission entity but the SF fault does not occur at the protection transmission entity, and the performance degrade of the work transmission entity is more serious than that of the protection transmission entity, it is determined to perform the protection switching. Here, the performance monitoring parameters obtained when the performance monitoring is performed includes time delay, jitter, or packet loss ratio, and by comparing the performance parameters, the performance degrade degrees of the work transmission entity and the protection transmission entity may be determined.

Under other situation except for the mentioned situations, the protection switching needs not to be performed.

Definitely, during a specific process of implementing the present invention, it is determined to perform the protection switching only under the first situation, but in other situations, the protection switching is not performed; alternatively, it is determined to perform the protection switching under the first and the second situations, but in other situations, the protection switching is not performed.

After the protection switching is triggered, as shown in FIG. 6, through the selector and the bridge, the ingress node transmits the normal service transmitted on the work transmission entity at which the fault occurs on the work transmission entity and the protection transmission entity simultaneously, and the egress node receives the normal service transmitted on the protection transmission entity. Here, if an extra service or a test packet is originally transmitted on the protection transmission entity, the transmission is stopped. If the performance monitoring is originally performed through the connectivity detection packet, the performance monitoring of this manner is stopped. If the performance monitoring is originally performed by obtaining the performance parameters of the transmission entity having the same path, the performance parameters are stopped from being obtained. The performance monitoring performed on the transmission entity is performed before the service reaches the selector of the egress node, so after the protection switching, the performance monitoring may be performed on the protection transmission entity and the work transmission entity through the normal service transmitted on the protection transmission entity and the work transmission entity.

If it is determined that the situation requiring to perform the protection switching disappears according to the result of the fault detection and the performance monitoring, protection recovery is triggered, so as to recover the manner of the service transmission, the manner of the fault detection, and the manner of the performance monitoring on the transmission entity before the protection switching, as shown in the state of FIG. 5.

Figure 7:
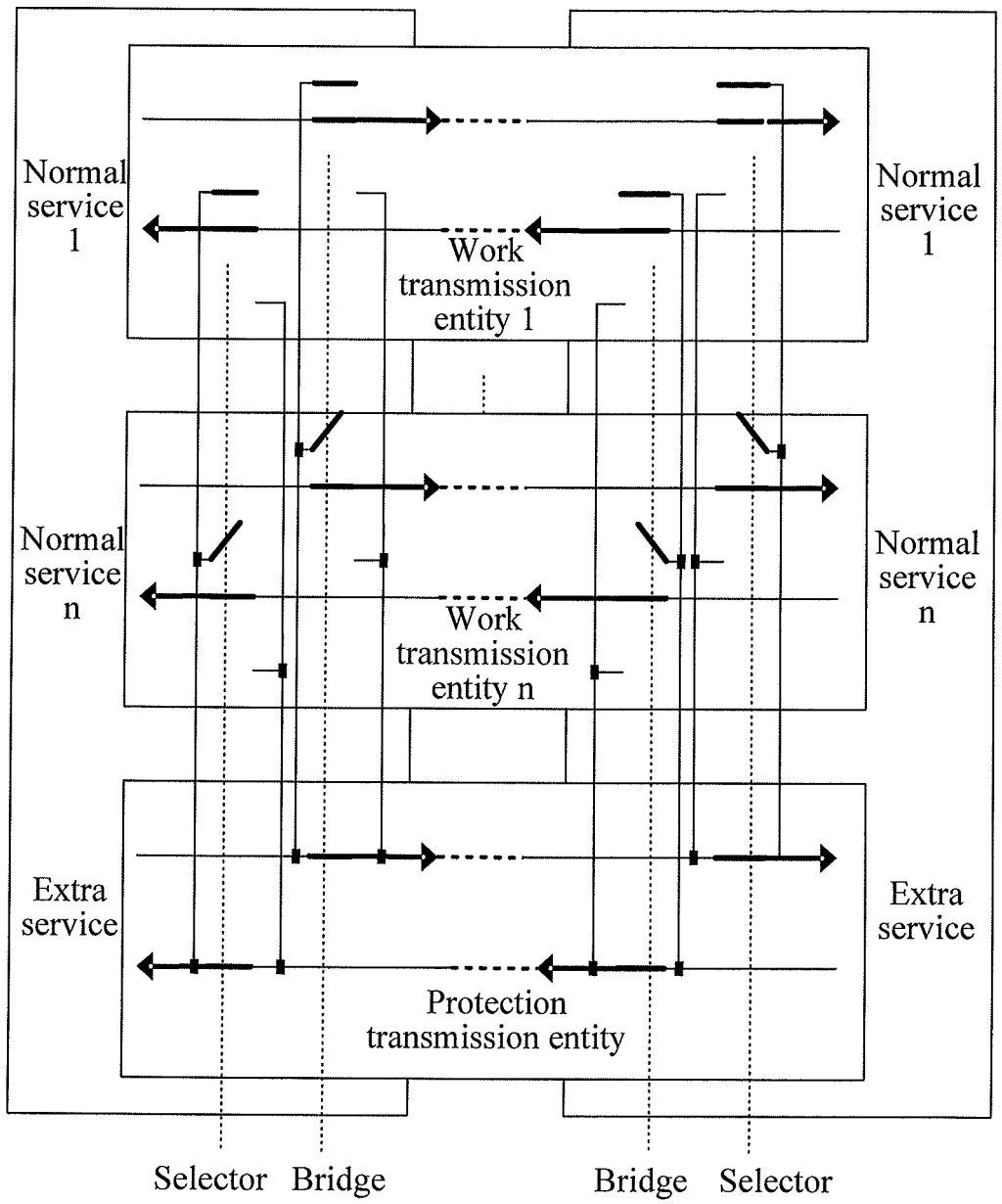
FIG. 7 is a schematic view of service transmission before protection switching under a scene of adopting a selective bridge according to an embodiment of a method for protection switching decision.
Figure 8:
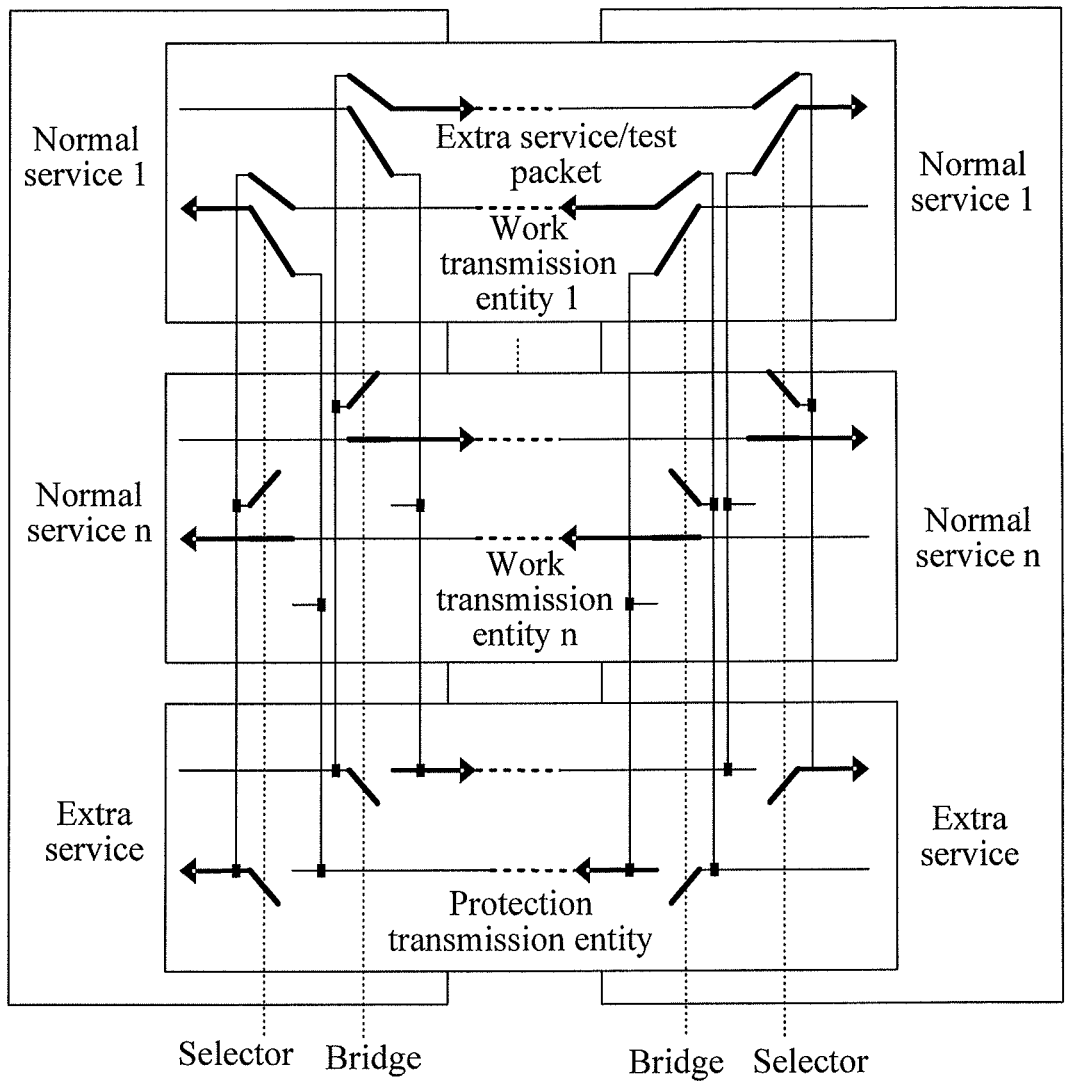
FIG. 8 is a schematic view of service transmission after protection switching under a scene of adopting a selective bridge according to an embodiment of a method for protection switching decision.

The scene in which this embodiment is applied to a packet-based network, and 1:n protection is implemented when the selective bridge is adopted on the ingress node is shown in FIGS. 7 and 8.

FIG. 7 shows the situation of the service transmission on each transmission entity before the protection switching. It may be known from FIG. 7 that each work transmission entity transmits the respective normal service, the fault detection is performed on the work transmission entity through the connectivity detection packet, and the performance monitoring is performed on the work transmission entity through the normal service transmitted on the work transmission entity.

When the protection transmission entity has the extra service transmitted thereon, the fault detection is performed on the work transmission entity through the connectivity detection packet, and the performance monitoring is performed on the protection transmission entity through the transmitted extra service.

When no extra service is transmitted on the protection transmission entity, in addition to performing the fault detection, the performance monitoring may be performed by adopting the following three manners. In a first manner, the performance monitoring is performed by transmitting the test packet on the protection transmission entity through an OAM mechanism. In a second manner, the performance monitoring is performed through the always transmitted connectivity detection packet. In a third manner, the performance monitoring is performed on the transmission entity having the same path as the protection transmission entity, and performance parameters of the protection transmission entity are obtained. The same path here refers to that as the protection transmission entity, the additional transmission entity passes through the same nodes and the same links of the protection transmission entity between the ingress node and the egress node.

The mentioned shows the manner of the service transmission on the transmission entity and the manner of performing the fault detection and the performance monitoring on the transmission entity under the situation that no fault occurs on the work transmission entity. According to the fault detection and the performance monitoring performed on the transmission entity, it is determined whether to perform the protection switching. The specific determining manner is the same as the determining manner under the scene of adopting the broadcasting bridge.

After the protection switching is triggered, as shown in FIG. 8, through the selector and the bridge, the ingress node switches the normal service transmitted on the work transmission entity at which the fault occurs to the protection transmission entity for being transmitted, and performs the performance monitoring on the protection transmission entity through the normal service transmitted on the protection transmission entity, and the egress node receives the normal service transmitted on the protection transmission entity. Here, if an extra service or a test packet is originally transmitted on the protection transmission entity, the transmission is stopped. If the performance monitoring is originally performed through the connectivity detection packet, the performance monitoring of the manner is stopped. If the performance monitoring is originally performed by obtaining the performance parameters of the transmission entity having the same path, the performance parameters are stopped from being obtained.

In addition to performing the fault detection on the work transmission entity at which the fault occurs, as shown in FIG. 8, the ingress node transmits the extra service or the test packet on the work transmission entity and performs the performance monitoring on the work transmission entity, or performs the performance monitoring on the work transmission entity by using the existing connectivity detection packet, or performs the performance monitoring on the work transmission entity by performing the performance monitoring on the transmission entity having the same path as the work transmission entity and obtaining the performance parameters of the work transmission entity.

If the extra service is transmitted on the work transmission entity, the transmitted extra service may be switched from the protection transmission entity to the work transmission entity, or other extra services may be transmitted directly on the work transmission entity.

If it is determined that the situation requiring to perform the protection switching disappears according to the result of the fault detection and the performance monitoring, protection recovery is triggered, so as to recover the manner of the service transmission, the manner of the fault detection, and the manner of the performance monitoring on the transmission entity before the protection switching.

In the embodiment, the fault detection, the performance monitoring, and the determining of whether performing the protection switching and the protection recovery are performed at the ingress node and/or the egress node.

The method for protection switching decision is described in detail through embodiments. In the following, the system for protection switching decision is described in detail through embodiments.

Figure 9:
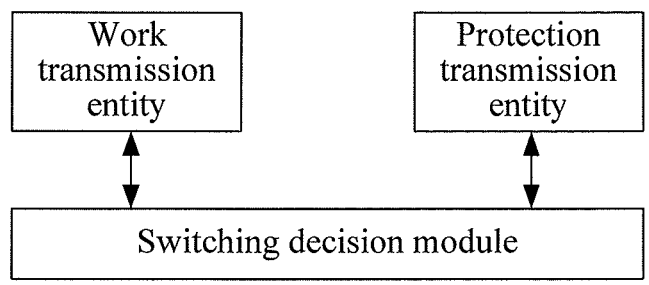
FIG. 9 is a schematic overall structural view of an embodiment of a system for protection switching decision.

The system for protection switching decision according to the present invention is applied to a 1:n protection switching technique. FIG. 9 shows a schematic overall structural view of an embodiment of the system for protection switching decision. The system includes a work transmission entity, a protection transmission entity, and a switching decision module. The switching decision module performs performance detection on the work transmission entity according to a transmitted normal service; and performs performance monitoring on the protection transmission entity by transmitting a test packet on the protection transmission entity, when no extra service is transmitted on the protection transmission entity, or performs the performance monitoring on the work transmission entity by using an existing connectivity detection packet, or performs the performance monitoring on the protection transmission entity by obtaining a performance monitoring result of a transmission entity having the same path as the protection transmission entity; and uses the performed performance monitoring as a part of references for determining to perform protection switching.

The switching decision module may be set in an ingress node and/or egress node.

The system according to this embodiment further includes a first switching control module or a second switching control module.

Figure 10:
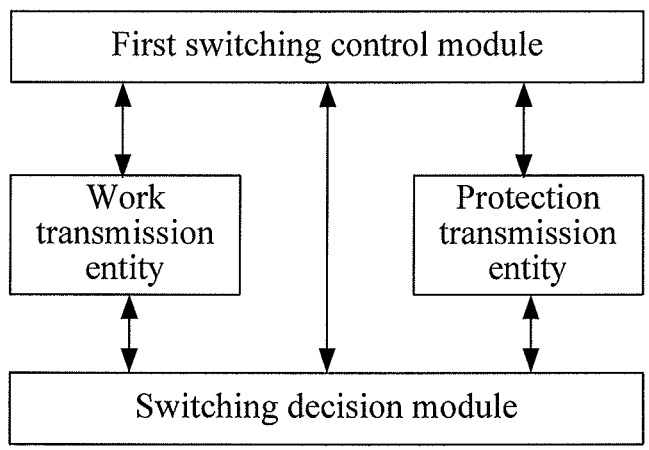
FIG. 10 is a schematic structural view in which a first switching control module is added on the basis of FIG. 9 according to an embodiment of a system for protection switching decision.

As shown in FIG. 10, when the system includes the first switching control module, the module is configured to obtain information of performing the protection switching determined by the switching decision module, and control to transmit the normal service on both the work transmission entity and the protection transmission entity according to the information; and the switching decision module further performs the fault detection and the performance monitoring on the protection transmission entity and the work transmission entity according to the transmitted normal service.

Figure 11:
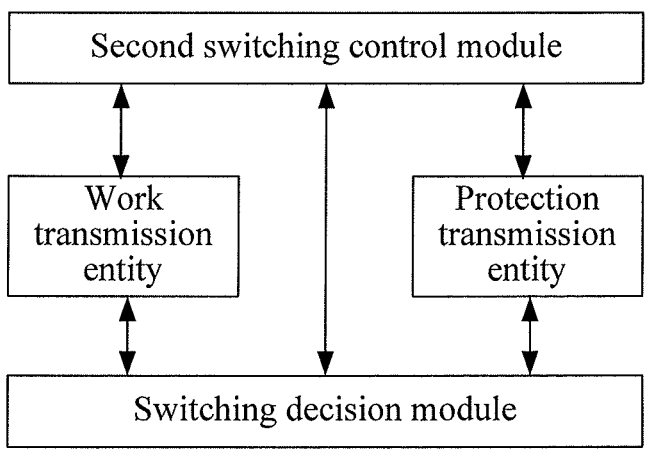
FIG. 11 is a schematic structural view in which a second switching control module is added on the basis of FIG. 9 according to an embodiment of a system for protection switching decision.

As shown in FIG. 11, when the system includes the second switching control module, the module obtains information of performing the protection switching determined by the switching decision module, controls to transmit the normal service only on the protection transmission entity according to the information, and controls whether the extra service or the test packet is transported on the work transmission entity; and the switching decision module further performs the fault detection and the performance monitoring according to the protection transmission entity, performs the fault detection on the work transmission entity, performs the performance monitoring on the work transmission entity according to the transmitted extra service or the test packet, or performs the performance monitoring on the work transmission entity by using the existing connectivity detection packet, or performs the performance monitoring on the work transmission entity by obtaining the performance monitoring result of the transmission entity having the same path as the work transmission entity.

The switching control module includes a bridge set in the ingress node and a selector set in the egress node. The bridge set in the ingress node in the first switching control module is a broadcasting bridge, and the bridge set in the ingress node in the second switching control module is a selective bridge.

In addition to performing the performance monitoring on the transmission entity without transmitting the service by transmitting the test packet, or performing the performance monitoring on the transmission entity by using the connectivity detection packet, or performing the performance monitoring on the transmission entity by obtaining the performance monitoring result of the transmission entity having the same path as the transmission entity without transmitting the service, for the 1:n protection switching using the broadcasting bridge, two methods for realizing that the SD triggers the protection switching and avoiding the frequent switching exist. Here, only the situation that the SD triggers the protection switching is considered, the situations that the SF triggers the protection switching and the SF and the SD together trigger the protection switching are the same as the mentioned embodiment, and are not repeated herein.

First Method

The ingress node adopts the broadcasting bridge, and it is defined that a priority of the SD on the work transmission entity is higher than that of the protection transmission entity, that is, when the SDs occur at the work transmission entity and the protection transmission entity simultaneously, the service is transmitted on the protection transmission entity.

Figure 12:
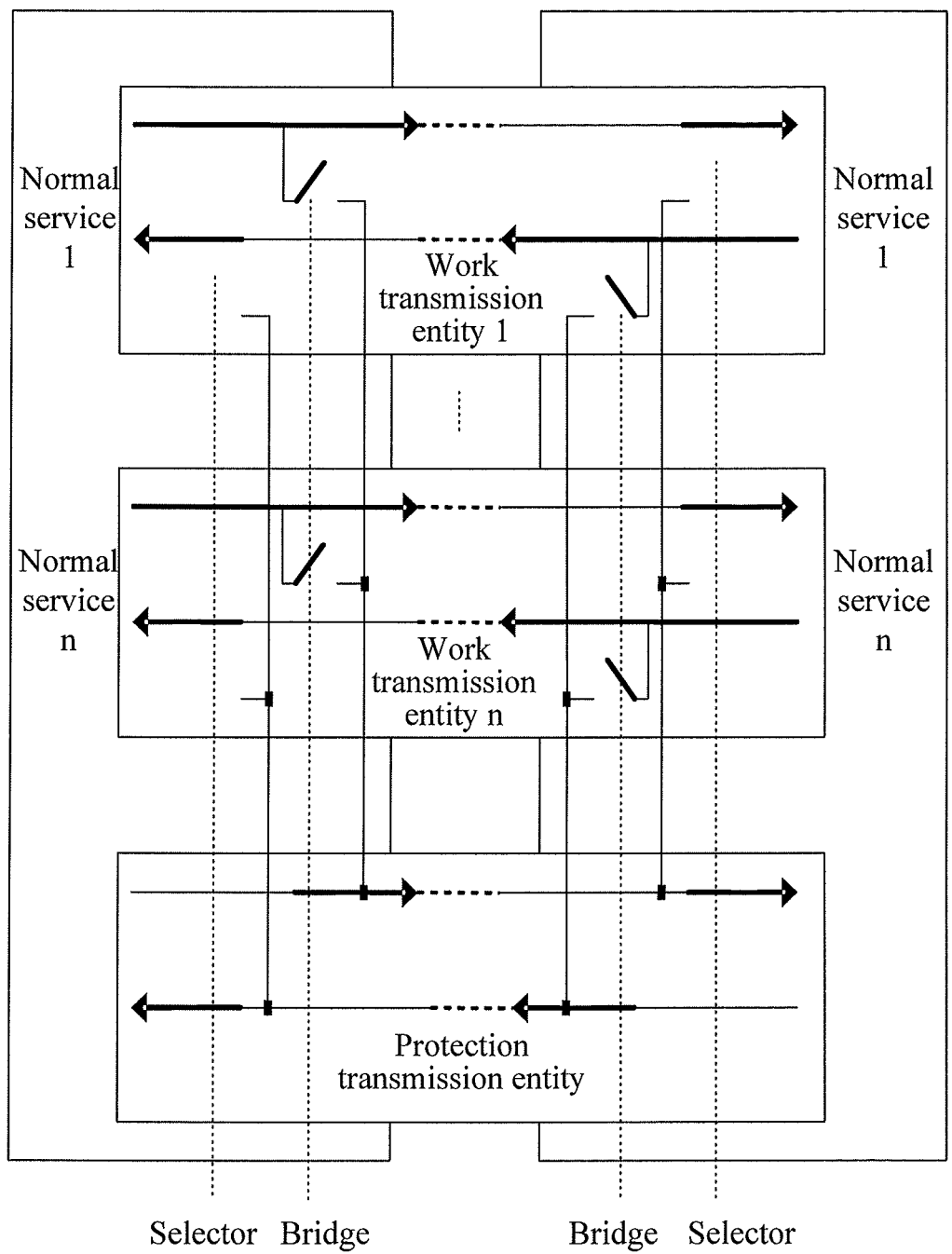
FIG. 12 is a schematic view of service transmission before protection switching under a scene of adopting a broadcasting bridge according to another embodiment of a method for protection switching decision.

As shown in FIG. 12, under the normal situation, the normal service is transmitted on the work transmission entity. The work transmission entity performs the performance monitoring on the transmitted service, and no service is transmitted on the protection transmission entity, so the performance monitoring cannot be performed, here the SD does not occur at the protection transmission entity.

Figure 13:
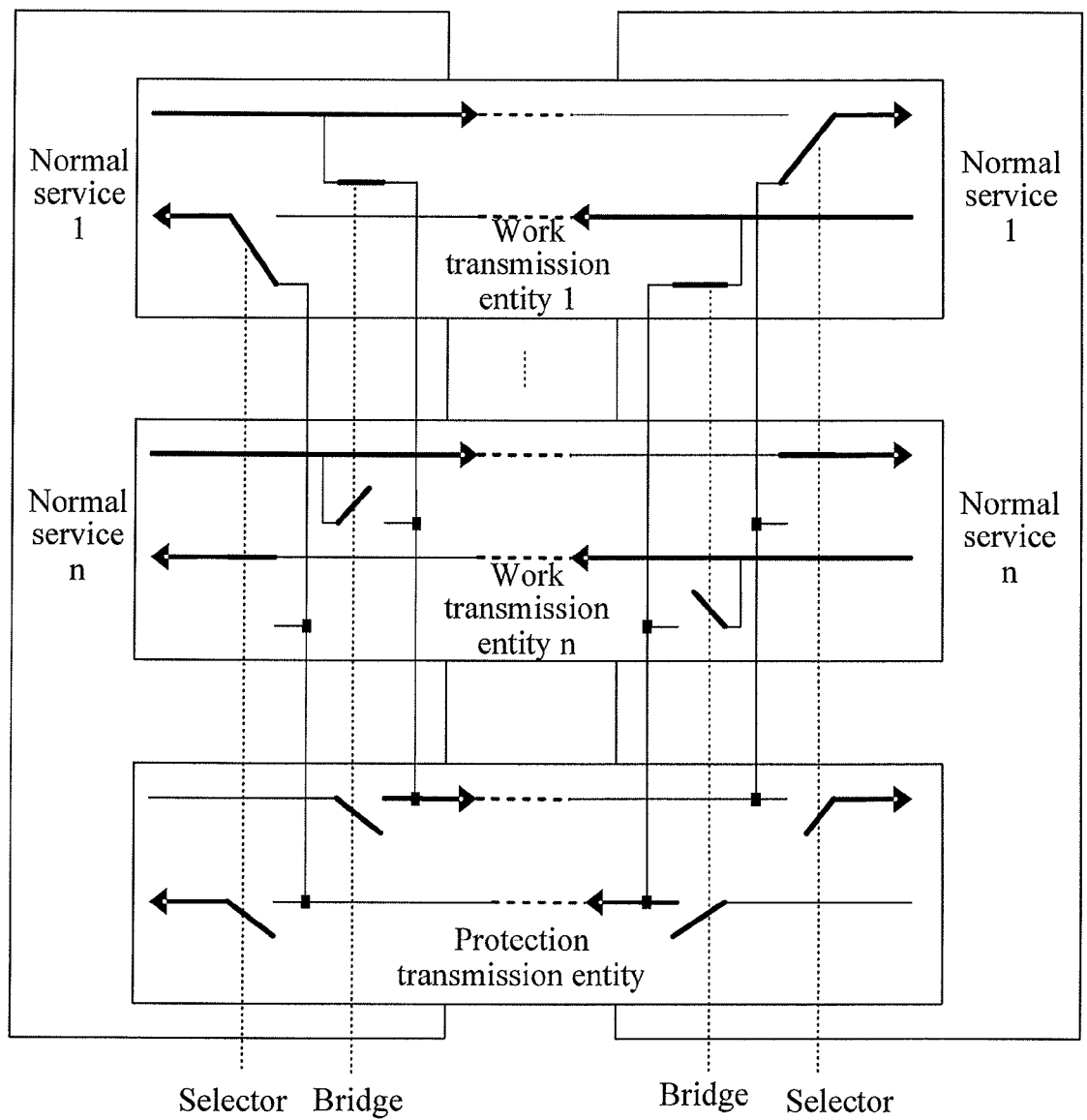
FIG. 13 is a schematic view of service transmission after protection switching under a scene of adopting a broadcasting bridge according to another embodiment of a method for protection switching decision.

As shown in FIG. 13, when the SD is detected on the work transmission entity, the sink end selects to receive the service from the protection transmission entity and notifies the source end that the SD is detected on the work transmission entity. The broadcasting bridge of the source end sends the service to the work transmission entity and the protection transmission entity simultaneously. Here, the protection transmission entity and the work transmission entity may perform the performance monitoring according to the transmitted service. If the SD is detected on the protection transmission entity at this time, that is, the SDs occur at the work transmission entity and the protection transmission entity simultaneously, because the priority of the SD on the work transmission entity is higher than that of the protection transmission entity, the normal service is still transmitted on the protection transmission entity, that is, the service is not handed over back to the work transmission entity to result in frequent switching.

Second Method

The ingress node still adopts the broadcasting bridge, when the sink end detects that the SD occurs at the work transmission entity, the sink end does not implement the handover (to the protection transmission entity) temporally, but only instructs the broadcasting bridge of the source end of sending the service to the work transmission entity and the protection transmission entity simultaneously. The sink end judges the SD for the second time, that is, simultaneously compares the states of the SDs on the work transmission entity and the protection transmission entity, and then determines whether to perform the switching. In this embodiment of the present invention, the priorities of the SDs on the work transmission entity and the protection transmission entity are not limited, and a relation between the priorities of the SDs on the work transmission entity and the protection transmission entity may be regulated as desired.

Figure 14:
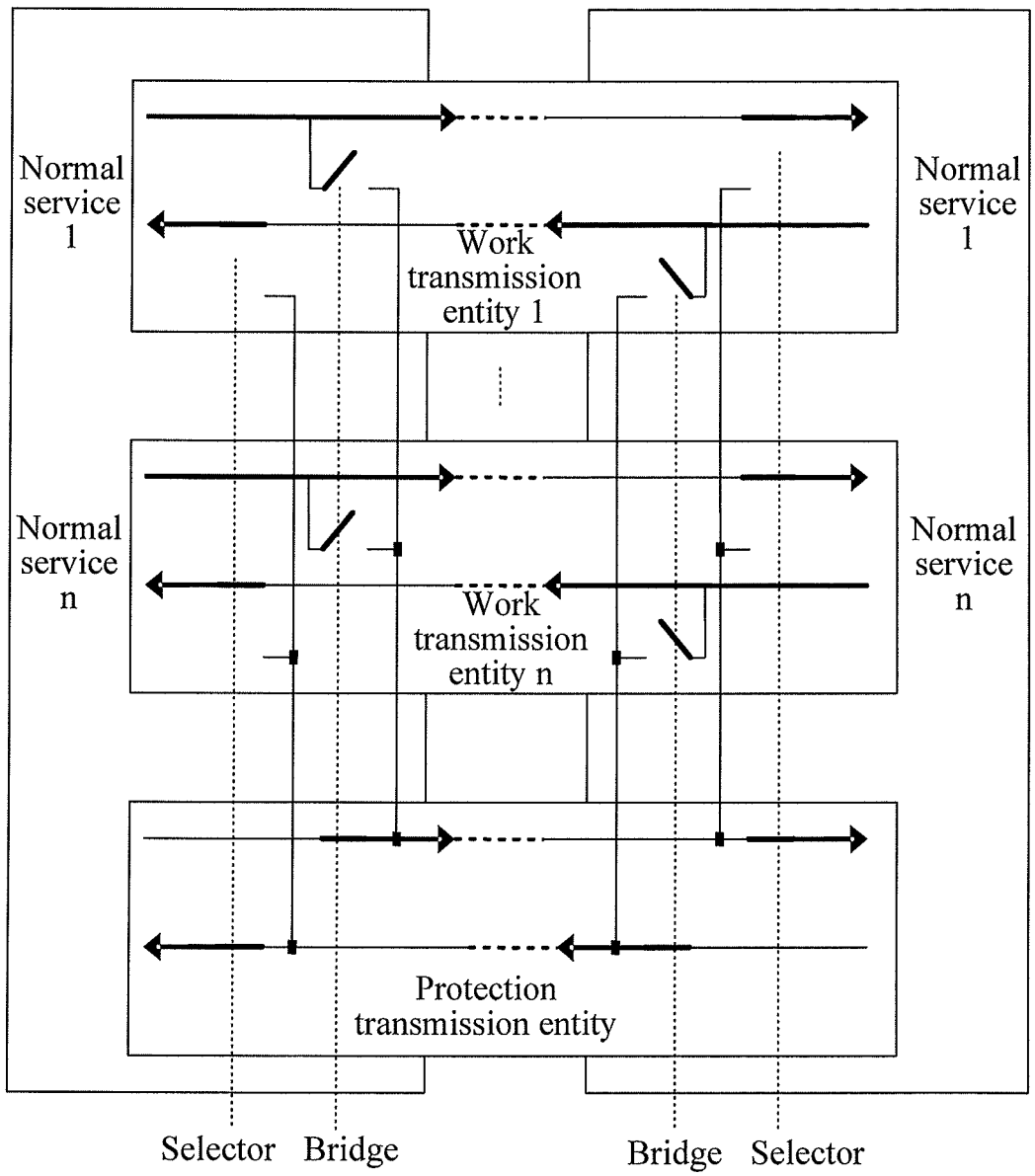
FIG. 14 is a schematic view of service transmission before protection switching under a scene of adopting a broadcasting bridge according to another embodiment of a method for protection switching decision.

As shown in FIG. 14, under the normal situation, the normal service is transmitted on the work transmission entity. The work transmission entity performs the performance monitoring on the transmitted service, and the service is not transmitted on the protection transmission entity, so the performance monitoring cannot be performed, here the SD does not occur at the protection transmission entity.

Figure 15:
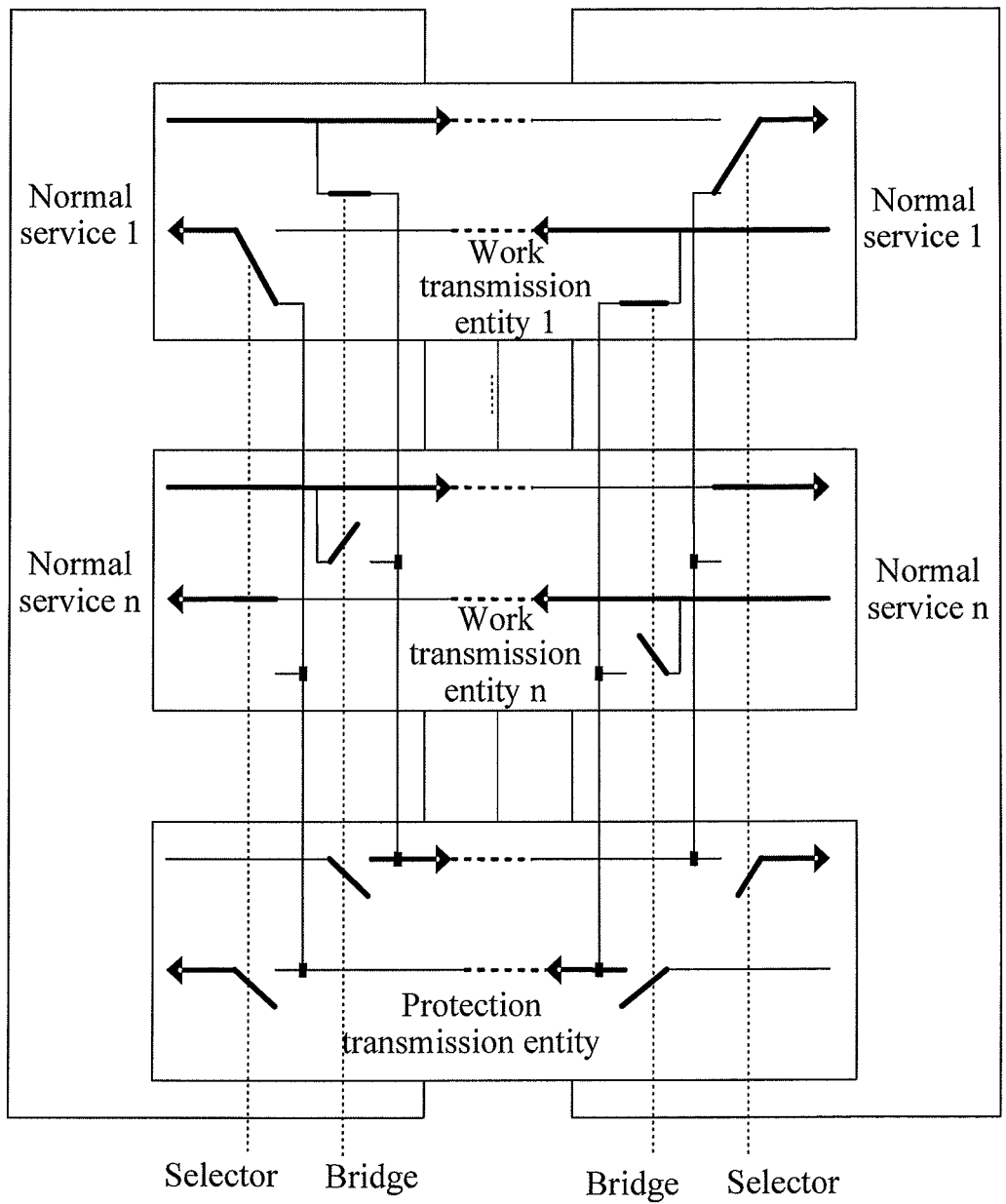
FIG. 15 is a schematic view of service transmission after protection switching under a scene of adopting a broadcasting bridge according to another embodiment of a method for protection switching decision.

As shown in FIG. 15, when the SD is detected on the work transmission entity, the sink end does not hand over to the protection transmission entity to receive the service temporally, but only notifies the source end that the SD is detected on the work transmission entity. The broadcasting bridge of the source end sends the service to the work transmission entity and the protection transmission entity simultaneously. Here, the protection transmission entity and the work transmission entity may perform the performance monitoring according to the transmitted service. The sink end judges how to perform the switching according to the practical states of the SDs on the work transmission entity and the protection transmission entity.

In this embodiment of the present invention, practically it is determined whether to perform the switching according to a result of judging the SD for the second time, that is, the states of the SDs on the work transmission entity and the protection transmission entity are known simultaneously, such that it is determined how to perform the switching according to the priorities of the SDs of the work transmission entity and the protection transmission entity, and the situation of the frequent switching does not occur.

In the two methods, the broadcasting bridge is used, the SD occurs at the work transmission entity, and the service is transmitted on the work transmission entity and the protection transmission entity.

In the first method, when detecting that the SD occurs at the work transmission entity, the sink end immediately hands over to the protection path for receiving the service. It is defined that the priority of the SD on the work transmission entity is higher than the protection transmission entity, thereby avoiding the frequent switching.

In the second method, when detecting that the SD occurs at the work transmission entity, the sink end does not immediately hand over to the protection path for receiving the service. The sink end waits for the broadcasting bridge to send the service to the work transmission entity and the protection transmission entity simultaneously, performs the judgment for the second time, and determines whether to perform the switching.

Through the above description in the detailed description, it is clear to persons skilled in the art that the present invention may be accomplished through hardware, or through software plus necessary universal hardware platform. Base on this, the technical solutions of the present invention may be embodied in the form of a software product. The software product may be stored in one or more nonvolatile storage media (for example, CD-ROM, USB flash drive, or removable hard disk) and contain several instructions configured to instruct a computer equipment (for example, a personal computer, a server, or a network equipment) to perform the method according to the embodiments of the present invention.

The above descriptions are merely preferred embodiments of the present invention, but not intended to limit the present invention. Any modification, equivalent replacement, and improvement made without departing from the spirit and principle of the present invention shall fall within the scope of the present invention.

The invention claimed is:

1. A method for service protection, applied to a 1:n switching technique, comprising:
   sending, by a source end, a service to a work transmission entity; performing, by the work transmission entity, performance monitoring through the service to detect Signal Degrade (SD) faults occurring at the work transmission entity, and receiving, by a sink end, the service from the work transmission entity;
   switching, by the source end, the service from the work transmission entity to both the work transmission entity and a protection transmission entity, when a Signal Degrade (SD) fault occurs at the work transmission entity, and selecting, by the sink end, to receive the service from the protection transmission entity;
   performing, by the protection transmission entity, the performance monitoring through the service to detect SD faults occurring at the protection transmission entity; and
   receiving, by the sink end, the service still from the protection transmission entity, when the SD faults occur at both the work transmission entity and the protection transmission entity.

2. The method according to claim 1, wherein the source end switches the service from the work transmission entity to both the work transmission entity and the protection transmission entity by adopting a broadcasting bridge.

3. The method according to claim 1, wherein before the receiving, by the sink end, the service still from the protection transmission entity, when the SD faults occur at both the work transmission entity and the protection transmission entity, the method further comprises:
   setting that a priority of the SD fault occurring at the work transmission entity is higher than the SD fault occurring at the protection transmission entity.

4. A method for service protection, applied to a 1:n switching technique, comprising:
   sending, by a source end, a service to a work transmission entity, performing, by the work transmission entity, performance monitoring through the service to detect Signal Degrade (SD) faults occurring at the work transmission entity, and receiving, by a sink end, the service from the work transmission entity;
   switching, by the source end, the service from the work transmission entity to both the work transmission entity and a protection transmission entity, when a Signal Degrade (SD) fault occurs at the work transmission entity, and receiving, by the sink end, the service still from the work transmission entity;
   performing, by the protection transmission entity, the performance monitoring through the service to detect SD faults occurring at the protection transmission entity; and
   performing, by the sink end, comparison and judgment on the SD faults occurring at the work transmission entity and the protection transmission entity, when the SD faults occur at both the work transmission entity and the protection transmission entity, and selecting to receive the service from the work transmission entity or the protection transmission entity according to a judgment result.

5. The method according to claim 4, further comprising:
   receiving, by the sink end, the service from the protection transmission entity, when the SD fault occurring at the work transmission entity is more serious than the SD fault occurring at the protection transmission entity.

6. The method according to claim 4, further comprising:
   detecting, by the sink end, that the SD fault occurs at the work transmission entity, and instructing the source end to switch the service from the work transmission entity to both the work transmission entity and the protection transmission entity.

7. The method according to claim 4, wherein the source end switches the service from the work transmission entity to both the work transmission entity and the protection transmission entity by adopting a broadcasting bridge.

8. A system for service protection, applied to a 1:n switching technique, comprising: a work transmission entity, a protection transmission entity, a source end, and a sink end; wherein
   the work transmission entity is configured to transmit a service, and perform performance monitoring through the service to detect Signal Degrade (SD) faults occurring at the work transmission entity;

the source end is configured to send the service to the work transmission entity; and switch the service from the work transmission entity to both the work transmission entity and the protection transmission entity, when a Signal Degrade (SD) fault occurs at the work transmission entity;

the protection transmission entity is configured to transmit the service, and perform the performance monitoring through the service to detect SD faults occurring at the protection transmission entity; and the sink end is configured to receive the service from the work transmission entity; select to receive the service from the protection transmission entity when the SD fault occurs at the work transmission entity; and still receive the service from the protection transmission entity when the SD faults occur at both the work transmission entity and the protection transmission entity.

9. The system according to claim 8, wherein a broadcasting bridge is set on the source end, and the source end switches the service from the work transmission entity to both the work transmission entity and the protection transmission entity by adopting the broadcasting bridge.

10. A system for service protection, applied to a 1:n switching technique, comprising: a work transmission entity, a protection transmission entity, a source end, and a sink end; wherein the work transmission entity is configured to transmit a service, and perform performance monitoring through the service to detect Signal Degrade (SD) faults occurring at the work transmission entity;

the source end is configured to send the service to the work transmission entity; and switch the service from the work transmission entity to both the work transmission entity and the protection transmission entity, when a Signal Degrade (SD) fault occurs at the work transmission entity;

the protection transmission entity is configured to transmit the service, and perform the performance monitoring through the service to detect SD faults occurring at the protection transmission entity; and the sink end is configured to receive the service from the work transmission entity; still receive the service from the work transmission entity, when the SD fault occurs at the work transmission entity; perform comparison and judgment on the SD faults occurring at the work transmission entity and the protection transmission entity when the SD faults occur at both the work transmission entity and the protection transmission entity, and select to receive the service from the work transmission entity or the protection transmission entity according to a judgment result.

11. The system according to claim 10, wherein the sink end is further configured to receive the service from the protection transmission entity, when the SD fault occurring at the work transmission entity is more serious than the SD fault occurring at the protection transmission entity.

12. The system according to claim 10, wherein a broadcasting bridge is set on the source end, and the source end switches the service from the work transmission entity to both the work transmission entity and the protection transmission entity by adopting the broadcasting bridge.

* * * * *